(12) United States Patent
Gayden et al.

(10) Patent No.: US 10,297,885 B2
(45) Date of Patent: May 21, 2019

(54) LITHIUM ION BATTERY AND CAPACITOR HYBRID SYSTEM IN A SINGLE POUCH

(71) Applicant: GM GLOBAL TECHNOLOGY OPERATIONS LLC, Detroit, MI (US)

(72) Inventors: Xiaohong Q. Gayden, West Bloomfield, MI (US); Zhiqiang Yu, Shanghai (CN); Haijing Liu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/015,227

(22) Filed: Feb. 4, 2016

(65) Prior Publication Data

US 2016/0285137 A1  Sep. 29, 2016

Related U.S. Application Data

(63) Continuation-in-part of application No. PCT/CN2015/075046, filed on Mar. 25, 2015.

(51) Int. Cl.
*H01M 12/00* (2006.01)
*H01G 11/08* (2013.01)
(Continued)

(52) U.S. Cl.
CPC .......... *H01M 12/005* (2013.01); *H01G 11/06* (2013.01); *H01G 11/08* (2013.01); *H01G 11/24* (2013.01); *H01G 11/34* (2013.01); *H01G 11/46* (2013.01); *H01G 11/58* (2013.01); *H01G 11/62* (2013.01); *H01G 11/66* (2013.01); *H01G 11/72* (2013.01); *H01G 11/78* (2013.01); *H01G 11/86* (2013.01); *H01M 4/0404* (2013.01); *H01M 4/661* (2013.01); *H01M 10/0459* (2013.01); *H01M 10/0525* (2013.01); *H01M 10/0583* (2013.01); *H01M 10/4264* (2013.01); *H01M 16/00* (2013.01); *H01M 2/024* (2013.01);
(Continued)

(58) Field of Classification Search
None
See application file for complete search history.

(56) References Cited

U.S. PATENT DOCUMENTS 6,165,642 A * 12/2000 Kawakami ............ H01M 4/131
429/218.1
6,631,072 B1  10/2003 Paul et al.
(Continued)

FOREIGN PATENT DOCUMENTS

CN         201927685 U       8/2011

OTHER PUBLICATIONS

Derek Johnson, Battery combines Li-ion energy, ultracapacitor power, SPIE; May 17, 2013, SPIE Newsroom, DOI: 10.1117/2.1201305.004818.

*Primary Examiner* — Carmen V Lyles-Irving
(74) *Attorney, Agent, or Firm* — Reising Ethington P.C.

(57) ABSTRACT

Lithium-ion battery cells and a lithium-ion utilizing capacitor cells are placed spaced-apart in a common container and infiltrated with a common lithium-ion transporting, liquid electrolyte. The lithium-ion-utilizing capacitor and lithium-ion cell battery are combined such that their respective electrodes may be electrically connected, either in series or parallel connection for energy storage and management in an automotive vehicle or other electrical power supply application.

18 Claims, 2 Drawing Sheets

(51) Int. Cl.
*H01G 11/24* (2013.01)
*H01G 11/62* (2013.01)
*H01G 11/72* (2013.01)
*H01G 11/78* (2013.01)
*H01M 10/0525* (2010.01)
*H01M 10/42* (2006.01)
*H01M 10/04* (2006.01)
*H01M 10/0583* (2010.01)
*H01M 16/00* (2006.01)
*H01G 11/06* (2013.01)
*H01G 11/34* (2013.01)
*H01G 11/46* (2013.01)
*H01G 11/58* (2013.01)
*H01G 11/66* (2013.01)
*H01G 11/86* (2013.01)
*H01M 4/04* (2006.01)
*H01M 4/66* (2006.01)
*H01M 2/02* (2006.01)
*H01M 4/485* (2010.01)
*H01M 4/505* (2010.01)
*H01M 10/0568* (2010.01)

(52) U.S. Cl.
CPC ............ *H01M 4/485* (2013.01); *H01M 4/505* (2013.01); *H01M 10/0568* (2013.01); *H01M 2220/20* (2013.01); *Y02E 60/122* (2013.01); *Y02E 60/13* (2013.01); *Y02T 10/7011* (2013.01); *Y02T 10/7022* (2013.01)

(56) References Cited

U.S. PATENT DOCUMENTS

| | | | |
|---|---|---|---|
| 7,186,473 B2 | 3/2007 | Shieu et al. | |
| 8,481,203 B2 | 7/2013 | Reis et al. | |
| 2003/0035982 A1* | 2/2003 | Ryu | H01G 9/016 429/7 |
| 2003/0134158 A1 | 7/2003 | Kung | |
| 2008/0286194 A1* | 11/2008 | Eriksson | B01J 23/6482 423/594.8 |
| 2009/0023074 A1* | 1/2009 | Matsui | H01M 10/0569 429/326 |
| 2009/0033286 A1 | 2/2009 | Rosa et al. | |
| 2010/0075210 A1* | 3/2010 | Lee | H01M 4/587 429/94 |
| 2011/0020699 A1* | 1/2011 | Inagaki | C01G 23/005 429/181 |
| 2011/0027666 A1* | 2/2011 | Burchardt | B60L 11/1879 429/406 |
| 2011/0164347 A1* | 7/2011 | Aitchison | H01G 9/016 361/502 |
| 2013/0004827 A1* | 1/2013 | Miyazaki | H01M 2/0217 429/145 |
| 2013/0266824 A1 | 10/2013 | Cowperthwaite et al. | |
| 2013/0266826 A1 | 10/2013 | Cowperthwaite et al. | |
| 2015/0004498 A1* | 1/2015 | Cheng | H01M 2/145 429/247 |
| 2015/0147626 A1* | 5/2015 | Tajima | H05K 5/0086 429/139 |

* cited by examiner

LITHIUM ION BATTERY AND CAPACITOR HYBRID SYSTEM IN A SINGLE POUCH

This application is a continuation-in-part of PCT application, PCT/CN 2015/075046, filed on Mar. 25, 2015, titled "Capacitor-Battery Hybrid Formed By Plasma Powder Electrode Coating." The complete contents of that application are incorporated herein by reference.

TECHNICAL HELD

A combination of a lithium-ion-utilizing capacitor and a lithium-ion battery is made in which an electrochemical capacitor and battery of like layered structures are assembled with a common non-aqueous electrolyte in a common close-fitting pouch and electrically interconnected as a hybridized capacitor-battery, suitable for providing balanced energy and power to electrical load demanding devices.

BACKGROUND OF THE INVENTION

Electric powered automotive vehicles use multi-cell batteries to provide electrical energy for providing electrical power for driving the vehicle and for providing electrical energy to many devices on the vehicle. Batteries comprising many lithium-ion electrochemical cells are examples of such electrical power sources. And such batteries are used in many non-automotive applications.

In some applications it may be useful to combine a lithium-ion battery with a capacitor. For example, such capacitors may be charged during braking of the vehicle and the stored electrical charge used in recharging cells of a lithium-ion battery.

There is a need for a practice to jointly package and employ cells for lithium-ion batteries and such capacitors for efficiency in their mutual interconnection and interaction.

SUMMARY OF THE INVENTION

It is believed that there are applications in electrically powered automotive vehicles (and in many non-automotive applications) in which suitable lithium-containing capacitor structures and suitable lithium-ion battery structures may be placed close to each other (but physically separated), as in a common close-fitting pouch or like container, and to efficiently share a common volume of a lithium-ion conducting electrolyte, with a suitable amount of electrolyte constituents for both devices. A hybridized combination of capacitor and battery is thus provided. Further, the capacitor and battery are each composed, shaped, and structured to be compactly packaged in a flexible pouch in a physically spaced-apart arrangement for them to be electrically connected to external devices in either DC series or DC parallel connection.

Here the capacitors include (1) electric double layer capacitors (ELDC), (2) supercapacitors, and (3) hybrid-capacitors. An ELDC-type capacitor is based on the formation of electric double layers on the surfaces of electrodes, where cations and anions of an electrolyte form Helmholz layers on the surfaces of both electrodes. During cell charge-discharge, positive ions such as lithium cations in the electrolyte adsorb on one electrode while the negative ions, anions such as ($PF_6^-$) adsorb on the other electrode. The fundamental process is adsorption and desorption, which enables the faster rate of charging and discharging. Supercapacitors utilize the hybridization of electric double layer capacitance with redox capacitance, where the composite electrode material is prepared to consist of porous carbon and fine metal particles. Hybridcapacitors (or asymmetric supercapacitors are proposed to get high capacitance and high energy density using different material at the two electrodes, anode and cathode, such as graphitized carbon at the anode and activated carbon at the cathode, where the intercalation/de-intercalation of $Li^+$ at the anode and the formation of electric double layers at the cathode are intended to occur.

In the lithium-ion battery cell, the negative electrode (anode) releases lithium ions (de-intercalates lithium ions) during discharging of the cell, and the positive electrode (cathode) absorbs lithium ions (intercalates lithium ions). The negative electrode releases electrons to the external circuit and the positive electrode receives them. The reverse electrochemical process occurs when the battery is charged.

In preferred embodiments of the invention the capacitor and battery have a similar or complementary shape which enables them to fit compactly in a flexible pouch with external terminals for electrical connections with external devices. The close proximity of the separate capacitor and lithium-ion battery cell structures, with their common lithium-ion transporting electrolyte, minimizes their size, simplifies electrical connections, and facilitates their interaction in providing electrical energy to nearby electrical loads.

In an illustrative example, each positive and negative electrode member of the hybridized capacitor and battery combination may be prepared in a rectangular shape of suitable predetermined sides and thickness dimensions for assembly of the complementary, hybridized members in operating units. Pre-formed current collector foils for each of the positive and negative electrodes of the capacitor and battery may serve as substrates for the application of porous layers of the respective resin-bonded, particulate, active electrode materials. Such current collector foils are typically flat and are sized with opposing rectangular surfaces (faces) of suitable area for the coating or deposit of a suitable resin-bonded layer of selected porous particulate electrode material on each side (each major face) of the foil. The current collector foil may have an uncoated tab extending from one side for electrical connection of the electrode material with other electrodes or with an external electrical circuit.

Examples of suitable particulate anode materials for the capacitor include graphite, activated carbon, and lithium-titanium containing oxides and phosphates. Examples of suitable cathode materials include certain lithium-metal oxides and phosphates, activated carbon, graphite, and additional materials which will be identified below in this specification. Often the respective active electrode materials are applied in particulate form with a suitable binder, if necessary, to the opposite faces of a compatible current collector foil. In a "wet coating method" a polymeric binder is dispersed in a liquid vehicle or solvent and applied as a coating to the active electrode particles. The wet mixture is applied to the major opposing surfaces of the current collector foil, the liquid vehicle removed, and the binder cured, if necessary, to form uniform porous layers of the electrode material on the major opposite surfaces of the current collector. In another process, particles of electrode material and a binder may be deposited as a porous layer on a current collector surface by activating and spraying the particles using an atmospheric plasma method and apparatus.

The thickness of the electrode material layer, for the capacitor, which is often in the range of about 100-200 micrometers, is determined to provide a porous electrode layer for infiltration with a lithium-ion conducting electrolyte, to provide suitable lithium ion transporting properties for the capacitor. The electrolyte will typically be formed by dissolving a suitable lithium salt in anon-aqueous solvent in which lithium cations and complementary anions are formed and transported through the liquid solvent for the operation of both the capacitor and the adjacent lithium battery cell in the hybrid arrangement.

A porous separator, suitably a thin porous polymer separator, is used to cover and physically separate like-shaped, facing layers of opposing electrode materials in a capacitor cell. This may be accomplished in different ways. For example, when the respective porous particulate electrode layers have been formed on both sides of their rectangular current collector films (such as by the "wet method"), a coextensive porous separator strip of suitable width and length may be carefully wound, back and forth, around facing surfaces of the opposing positive and negative electrode material layers. In this practice, both surfaces of each electrode layer in a stack of alternating anode and cathode capacitor electrodes are covered by a porous separator layer. Both sides of each rectangular capacitor electrode member are thus covered with a porous separator layer. The resulting stack of electrodes and separator layers may be infiltrated with the liquid electrolyte to fill the pores of the anode and cathode electrode material layers and the pores of the wound separator layer.

A complementary lithium battery may be made using a like process. Examples of suitable particulate anode materials for the battery cell include graphite, activated carbon, and lithium and titanium containing oxides and phosphates. Examples of suitable cathode materials include certain lithium-metal oxides and phosphates, activated carbon, graphite, and additional materials which will be identified below in this specification.

The thickness of the electrode material layer for the battery, which is often in the range of about 100-200 micrometers, is determined to provide porous active electrode material layers for infiltration with a lithium-ion conducting electrolyte, to provide suitable lithium ion transporting properties for the battery and the capacitor.

A porous separator, suitably a porous polymer separator is placed as individual members or wound as a continuous strip layer between opposing electrodes of cells of the battery.

After the electrode materials for the capacitor and battery cell members have been suitably coated or deposited on and suitably bonded in porous layers to their respective current collector foils, the assembly of the elements for formation of layered capacitor units and battery units is completed for placement in a suitable pouch or other module container. Both the capacitor and the lithium-ion battery may have several layers of electrode materials (with interposed and outer porous separators or separator layers) with their respective current collectors. The outer surfaces of the electrode members at the ends of each capacitor and battery are typically covered with the porous separator layer. The current collectors are suitably connected so that the capacitor and lithium-ion battery members each have two terminals for each pouch or like container.

In preferred embodiments of the invention, an assembly of like-sized and shaped elements of both the capacitor member and the lithium-ion cell member are placed (e.g., side by side) in the pouch, but the facing electrode surface of the capacitor is covered with a porous separator layer, as is the near-by facing electrode surface of the adjacent battery. So facing surfaces of the capacitor and battery are physically separated from each other by at least the presence of their respective separator materials. In this assembled structure, one or more separator layers may be used to separate the capacitor and the battery. A suitable gap or spacing between generally flat facing surfaces of the capacitor and battery is in the range of about 0.01 min to about 10 mm. As stated, the pores of the electrode members of the capacitor and the lithium-ion cell, and their respective separators, are infiltrated with a common lithium ion transporting, non-aqueous lithium electrolyte solution.

Other aspects and features of our invention will be further understood following a more detailed description of illustrative capacitor and battery constructions and their placement in a suitable container.

BRIEF DESCRIPTION OF THE DRAWINGS

In FIG. 1, aside of the pouch has been removed to show a cross-sectional side view of the layered structures of the capacitor and lithium-ion cell and their common electrolyte solution. The respective electrode materials have been applied as porous, uniformly thick, particulate layers onto metal current collector foils. The respective separators have been applied and wound to cover both faces of each electrode member. Each electrode is a thin rectangular body. The current collector foils have connector tabs extending from their upper sides and are arranged for a series-type electric connection between a hybrid combination of the capacitor and its associated lithium-ion battery cell. In the series-type connection of FIG. 1 there are four separate current collector leads extending through the top of the pouch, representing the four terminals of the hybridized capacitor and lithium-ion battery.

In FIG. 2, only two terminals emerge through the top of the pouch because the positive electrode tabs of the capacitor and battery have been connected within the pouch, as have their negative electrode tabs.

DESCRIPTION OF PREFERRED EMBODIMENTS

Figure 1:
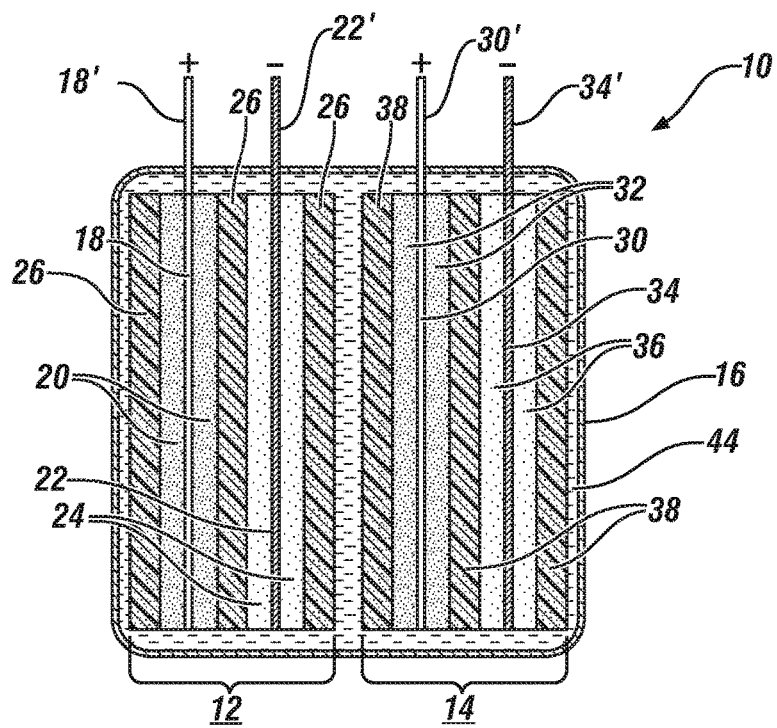
FIG. 1 is a schematic, cross-sectional side view of a positive electrode, a wound porous separator layer, and a negative electrode of a capacitor placed in a common pouch with a positive electrode, a wound porous separator layer, and negative electrode for a lithium-ion battery cell. In practice, each of the capacitor and lithium-ion battery may have many cells of layers of electrode materials deposited on current collector foils with a porous separator layer between each anode and cathode layer of a cell. The current collector tabs of the positive electrodes of the battery and capacitor would be suitably interconnected at their respective positive terminals and the current collector tabs of the negative electrodes of the battery and capacitor would be likewise connected at their respective negative terminals. The illustrations of the capacitor and lithium ion battery have been simplified in FIG. 1 by depicting only one of the sets of the electrode and separator elements of each capacitor unit and lithium-ion battery unit. The electrodes of the capacitor and the electrodes of the lithium ion battery cell and their respective separators are immersed in a common liquid electrolyte solution.

In accordance with practices of this invention, hybrid electrochemical cell combinations are prepared, consisting of a capacitor and a lithium-ion battery which are made, organized, and assembled to deliver a balanced energy-power performance. Both the capacitor and the battery will adsorb or intercalate lithium ions and both the capacitor and battery will be closely spaced in a common flexible pouch or other suitable container. In general, electrode members for both the capacitor and the battery may be prepared and assembled using similar or common electrode preparation and separator preparation methods and processing equipment. As stated, a uniform layer of particulate electrode material may be coated or deposited over a selected surface area of a metal foil current collector. The formation of electrode layers on current collectors may be conducted in sequential or complementary steps to accommodate the assembly of positive and negative electrodes on opposite sides of a compatible separator. A long porous polymeric separator sheet of suitable height may be wound back and forth (e.g., Z-type winding) between a stack of positive and negative electrode members so as to fully cover each layer of electrode material. Other methods of placing or winding separators against the faces of the electrodes may be used. The separator-positive electrode-separator-negative electrode-separator structures for a capacitor and a lithium-ion cell may thus be prepared separately, but contemporaneously, for assembly into a pouch and infiltration with a common volume of a non-aqueous, lithium-ion conducting electrolyte.

It is intended that selected electrode materials, for both the electrochemical capacitor positive and negative electrodes be prepared in the form of micrometer-size particles for deposition on one or both sides of a compatible metal current collector foil or sheet. In one embodiment of the invention the active electrode particles may be coated, for example, with a suitable polymer binder resin such as polyvinylidene difluoride polymer (PVDF) or with a suitable low-melting binder metal composition and deposited on a surface of a current collector (or the surface of a porous separator) using an atmospheric plasma process as disclosed in our above referenced PCT application (PCT/CN 2015/075046). In other embodiments of our invention, the particles of electrode materials are typically coated with a solution or dispersion of a suitable polymeric binder material and rolled, spread, or otherwise applied, in a porous layer of generally uniform thickness, as an electrode layer to the major surfaces of the current collector foil (e.g., a wet method). Electrode materials for the both the capacitor and lithium-ion cell may be separately prepared and deposited on selected cell substrates for assembly with porous separators into lithium-ion cells and capacitors, and placement together with a common lithium-ion transporting electrolyte in a pouch or other container.

Suitable lithium-adsorbing materials for deposition as cathode (positive electrode) particles for the capacitor include:

Activated carbon.

Metal oxides, $MO_x$ where M is one or more of Pb, Ge, Co, Ni, Cu, Fe, Mn, Ru, Rh, Pd, Cr, Mo, W, and Nb.

A lithium-metal-oxide including: $Li_xMO_2$ in which M is Co, Ni, Mn, Cr, or V.

$Li_xM_2O_4$, in which M is Co, Ni, Mn, Cr, or V.

$Li_xNi_yM_{1-y}O_2$, in which M is Fe or Mn.

$LiNi_{1-x-y-z}Co_xM1_yM2_zO_2$, in which M1, M2 are different metals selected from Al, Ni, Co, Fe, Mn, V. Cr, Ti, W, Ta, or Mo.

$LiMn_{2-x}M_xO_4$ in which M is one of Co, Ni, Fe, Cu, Cr, V.

One of $LiNiVO_4$, $LiNbO_3$, $LiFePO_4$, $LiTi_2(PO_4)_3$, or $Li_3V_2(PO_4)_3$.

$LiMPO_4$ in which M is one of Ti, Ge, Zr, Hf.

One or more of $Li_3FeV(PO_4)_3$, $LiFeNb(PO_4)_3$, $Li_2FeNb(PO_4)_3$, $Li_xFe_yMn_{1-y}PO_4$, $LiMSiO_4$ (M=Mn, Fe), $LiFe_2(WO_4)_3$, $Li_xFe_2(SO_4)_3$, and $LiFeO_2$.

A metal sulfide: NiS, $Ag_4Hf_3S_8$, CuS, FeS, and $FeS_2$.

A polymer such as: poly (3-methyl thiophene), polyaniline, polypyrrole, poly (para-phenylene), or polyacene.

As further described in this specification, cathode particles for the capacitor are usually deposited on an aluminum current collector foil.

Suitable materials for deposition as anode (negative electrode) particles for the capacitor include:

$Li_4Ti_5O_{12}$, $LiTi_2O_4$, $LiCrTiO_4$, $LiTi_2(PO_4)_3$, and graphite or activated carbon.

Negative electrode material for the capacitor is preferably deposited on a copper current collector foil.

Suitable separators are, for example, formed as porous layers of polyethylene, polypropylene, or an ethylene-propylene copolymer.

After the assembling of their electrodes and separators and filling their pores with the electrolyte solution, the hybrid capacitor and battery undergo a formation cycle and are then degassed. Suitable electrode material particle coating or application methods can be employed to optimize the surface area of the electrode material layers coated on the respective current collect foils, and can also control the porosity of the respective electrodes, in order to improve both the energy and power performance of the hybrid capacitor-battery.

The lithium-ion battery cell(s) component of this capacitor-battery cell hybrid combination may be formed of like current collector foils and like porous separator materials.

Examples of suitable cathode particulate materials (positive electrodes) for lithium-ion cells include lithium manganese oxide spinal ($LiMnO_4$), lithium manganese nickel cobalt oxide, lithium cobalt oxide, lithium nickel aluminum cobalt oxide, lithium iron phosphate, and other lithium oxides and phosphates.

Examples of particulate anode materials (negative electrodes) for lithium-ion cells include lithium titanate spinel ($Li_4Ti_5O_{12}$), graphite, activated carbon, and silicon-based materials such as silicon, silicon-based alloys, SiOx, silicon-tin composites, and lithium-silicon alloys.

The common electrolyte for the capacitor cell and the lithium-ion battery cell may be a suitable lithium salt dissolved in one or more organic liquid solvents, Examples of salts include lithium hexafluorophosphate ($LiPF_6$), lithium tetrafluoroborate ($LiBF_4$), lithium perchlorate ($LiClO_4$), lithium hexafluoroarsenate ($LiAsF_6$), and lithium trifluoroethanesulfonimide. Some examples of solvents that may be used to dissolve the electrolyte salt include ethylene carbonate, dimethyl carbonate, methylethyl carbonate, and propylene carbonate. There are other lithium salts that may be used and other solvents. But a combination of lithium salt and non-aqueous liquid solvent is selected for providing suitable mobility and transport of lithium ions between the opposing electrodes in the operation of both members of the hybrid assembly of the capacitor cell(s) and lithium-ion battery cell(s). And the lithium salt is capable of forming a suitable amount of cations and anions in the electrolyte solution for operation of both the lithium-ion cell and the capacitor which share the common electrolyte solution in their common container.

The electrolyte solution is carefully dispersed into and between closely spaced layers of the electrode elements and separator layers of each of the capacitor cell and the battery cell.

As described above in this specification, a thin porous separator layer is interposed between the major outer face of the negative electrode material layer and the major outer face of the positive electrode material layer of each of the capacitor and the battery unit. The porous separator may be formed of a porous film or of porous interwoven fibers of suitable polymer material, or of ceramic particles, or a polymer material filled with ceramic particles, in the assembly of the hybrid capacitor and separated lithium-ion cell units, the porous separator layer is filled with a liquid lithium-ion containing electrolyte and enables the transport of lithium ions between the porous electrode members. But the separator layer is used to prevent direct electrical contact between each of the negative and positive electrode material layers in each unit, and is shaped and sized to serve this function.

FIG. 1 is a schematic cross-sectional illustration of a pouch-contained assembly 10 of the elements of an electrochemical capacitor 12, a lithium-ion battery cell 14, a common electrolyte solution 44, and a polymer-coated, aluminum foil pouch 16 to contain the combined capacitor and cell elements for electrical series connection to each other and/or to other members of an electrical circuit. For example, the inner surface of the aluminum foil pouch is coated with a thin layer of polypropylene and the outer layer of the aluminum foil is coated with nylon or polyethylene terephthalate. One side of the pouch 16, including the closure seam of its sides, has been cut-away in the figure to show the relative positions of the electrochemical capacitor 12 and the lithium-ion cell 14. The flat rectangular outer surface of right-side capacitor separator 26 (as viewed in FIG. 1) is generally parallel to the flat rectangular outer surface of left-side battery separator 38. Preferably these generally flat rectangular separator surfaces 26, 38 are spaced apart by a small distance in the range of 0.01 mm to 10 mm.

Each capacitor may be formed of several layers of positive electrodes, negative electrodes, with a wound interposed separator layer, prepared as described in the following paragraphs. The like-charged electrode layers are connected by tabs on their current collectors, respectively, in a positive terminal and a negative terminal for the capacitor. The positive and negative tabs for the groups of positive and negative capacitor electrodes may be connected with other devices in an electrical circuit as desired. Lithium-ion batteries are also typically formed of many positive electrodes connected to a positive terminal and many negative electrodes connected to a negative terminal. The illustrations of FIGS. 1 and 2 have been simplified to depict a single set of electrodes for capacitor 12 and lithium-ion cell 14.

The illustrated electrochemical capacitor 12 comprises a positive electrode, which in this example comprises a rectangular aluminum foil current collector 18 with a connector tab 18' extending from its top side and through the overlapping surface of pouch 16. The positive electrode of the capacitor further comprises porous particulate layers of active positive electrode material 20 which have been coated on each face of the aluminum foil current collector 18. The positive electrode material for the capacitor may, for example, comprise a suitably porous layer of resin-bonded particles of activated carbon. For example, polyvinylidene difluoride polymer (PVDF) may be used as the binder resin. The thickness of the current collector foil 18 may be, for example, about ten micrometers and the lengths of the sides of the foil may, for example be in the range of 75 mm to 100 mm, not including the tab 18' (also serving as a terminal in this illustration). The porous layers of positive electrode material 20 may, for example, be about 10 to 500 micrometers in thickness, depending on the electrochemical requirements of the electrode, and applied to substantially cover the rectangular faces of current collector foil 18, but not tab 18'.

The electrochemical capacitor 12 further comprises a negative electrode, which in this example comprises a rectangular copper foil current collector 22 with a connector tab 22' (also serving as a terminal in this illustration) extending from its top side and through the overlying surface of pouch 16. The negative electrode of the capacitor further comprises porous particulate layers of electrode material 24 which have also been deposited on each face of the copper foil current collector but not on tab 22'. The negative electrode material for the capacitor may, for example, also be activated carbon. The side lengths and thickness of the copper current collector foil 22 are suitably like the dimensions of the positive electrode current collector foil. The porous layers of negative electrode material 24 may, for example, be of complementary thickness to that of the positive electrode materials and applied to substantially cover the rectangular faces of current collector foil 22, but not tab 22'.

As illustrated in FIG. 1, a porous polymeric separator layer 26 has been wound around and between the outer surfaces of the positive electrode layers 20 and the negative electrode layers 24. Porous separator 26 may be formed, for example, of polyethylene fibers. Separator 26 has a two-dimensional shape and a thickness. The width or height of the porous separator 26 is suitable to cover and separate the entire outer surfaces of the respective electrode material layers. The length of the porous separator 26 is sufficient to be wound around and to cover the outer surfaces of each electrode member surface in its cell or grouping. In FIG. 1 (and further illustrated in FIG. 3) separator 26 has been wound in a Z-type winding (as viewed from the top side of the stack of electrodes) around both outer surfaces of each layer of cathode electrode material.

Figure 3:
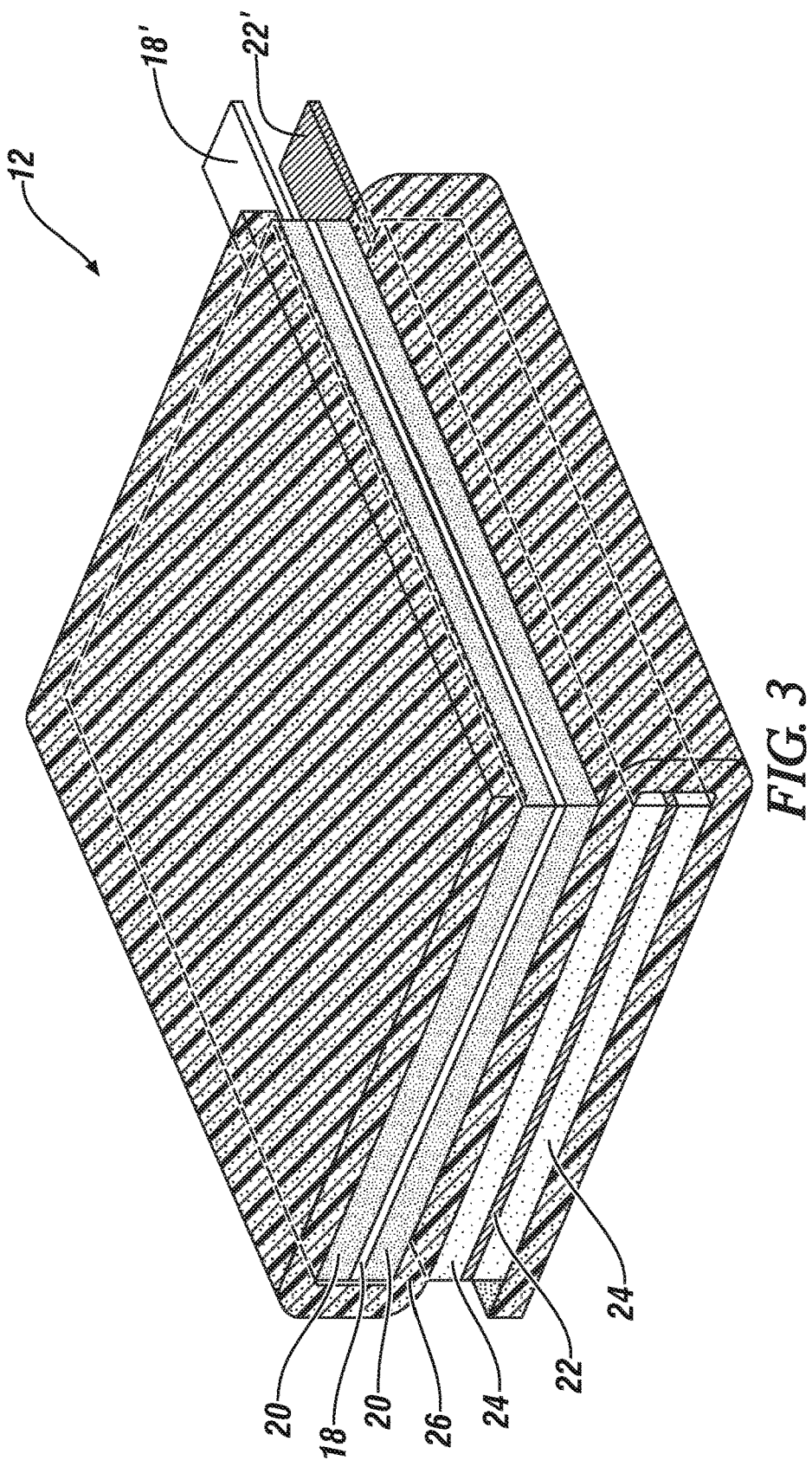
FIG. 3 is an enlarged schematic side view illustration of a nine layer capacitor structure like that illustrated in side views at 12 in FIG. 1 or at 112 in FIG. 2, A lithium-ion battery structure, such as 14 in FIG. 1 or 114 in FIG. 2, may be illustrated in a similar manner. In this embodiment the separator 26 has been wound in a Z-configuration as viewed from the tab side of the capacitor) to lie between facing surfaces of positive electrode material 20 and negative electrode material 24 and to cover the opposite faces (or outer faces in the illustration) of both electrode materials.

As illustrated in FIG. 1, the outer surface of one side of the positive electrode material 20 is placed close against one face of the porous separator layer 26 and the outer surface of one side of the negative electrode material 24 is pressed against the face of the porous separator 26. The separator layer 26 has also been wound around the side edges of the respective cathode electrode layers 20, 24 to cover their outer surfaces as they are depicted in FIG. 3. The portion of the wound separator 26 at the edges of the electrode layers is not depicted in the cross-sectional view of FIG. 1. In this example, the rectangular shape of separator is determined to cover the contacting surfaces of the respective electrode materials 20, 24 and to physically separate them. The shape and thickness of the porous separator 26 also serves to retain liquid electrolyte for lithium absorption and desorption by the electrode layers 20, 24 of the capacitor. In the assembled device, the pores of the electrode materials 20, 24 are infiltrated with liquid lithium-ion conducting electrolyte 44, as well as the pores of separator layer 26.

The liquid electrolyte 44 is intimately dispersed in the porous electrode layers and in the pores of the separators of each of the assembled capacitor 12 and battery 14. In the capacitor 12, lithium anions and corresponding cations (from the dissolved lithium electrolyte salt) are transported between the electrode materials 20 and 24 through the liquid electrolyte 44.

The structure of the lithium-ion cell or battery 14 is similar to that of capacitor 12 and the outline sizes and thickness of the respective current collector foils, electrode material layers and separator of battery 14 are comparable to the similar structural elements of capacitor 12. But the electrode materials may be different and the electrochemical reactions are different.

In this example and simplified illustration, battery 14 includes an aluminum positive electrode current collector foil 30 with a connector tab 30' extending through the overlying pouch material 16. Deposited positive electrode layers 32 are formed on both major faces of the aluminum current collector foil 30. The positive electrode material 32 for the battery 14 may, for example, be resin-bonded particles of $LiFePO_4$ or more preferably, resin-bonded particles of $LiMn_2O_4$. A copper negative current collector foil 34 with tab 34' is coated on both of its major faces with layers of negative electrode material 36. The particle layers of negative electrode material 36 preferably comprise resin-bonded particles of $Li_4Ti_5O_{12}$. Alternatively the negative electrode material may comprise particles of activated carbon or resin-bonded particles of activated carbon. The facing porous layers of positive electrode material 32 and of negative electrode material 36 are kept apart by porous polymer separator 38. In this illustration, porous polymer separator 38 is wound around the respective battery electrode members on as to cover each surface of the respective battery electrode materials 32, 36 to isolate them form physical contact with another electrode surface. The placed and assembled capacitor separator layer 26 and the battery separator layer 38 present generally parallel surfaces which serve to separate the capacitor 12 and the battery 14 when they are placed closely together (e.g., separator surfaces 26, 38 being spaced with a 0.01-10 mm gap) in their pouch 16.

In the assembled battery 14, placed in pouch 16, the pores of separator layer 38 and of electrode layers 32 and 36 are filled with the common suitable non-aqueous, lithium-ion conducting electrolyte 44. The electrolyte 44 may, for example, comprise a 1M solution of lithium hexafluorophosphate ($LiPF_6$) dissolved in a mixture of ethylene carbonate (EC, a cyclic carbonate), diethyl carbonate (DEC), and ethyl methyl carbonate EMC) (1:1:1 volume proportions or percentage) as solvent.

In FIG. 1, the current collector tab leads 18' and 22' for capacitor 12 and the current collector tab leads 30', 34' for battery 14, each extend through the adjoining pouch material and are positioned for serial electrical connections. The anchoring of the tab leads 18", 22', 30', and 34' in the pouch material contributes to maintaining the small separation between the capacitor 12 and battery 14. In a typical hybrid capacitor, these current collector leads would be the four terminal posts for the series-connected assembly in pouch 16. Such an arrangement offers many possibilities for interconnection of the capacitor electrodes and battery electrodes with each other and with other members of an electrical power-requiring system. The electrical connections between capacitor 12 and lithium-ion battery 14 may, for example, be through a DC-DC converter. This type of electrical interconnection could enable the capacitor 12 to store energy, for example, when an automotive vehicle is braking, and to later release energy to the adjacent lithium-ion battery 14 during vehicle starting or acceleration.

Figure 2:
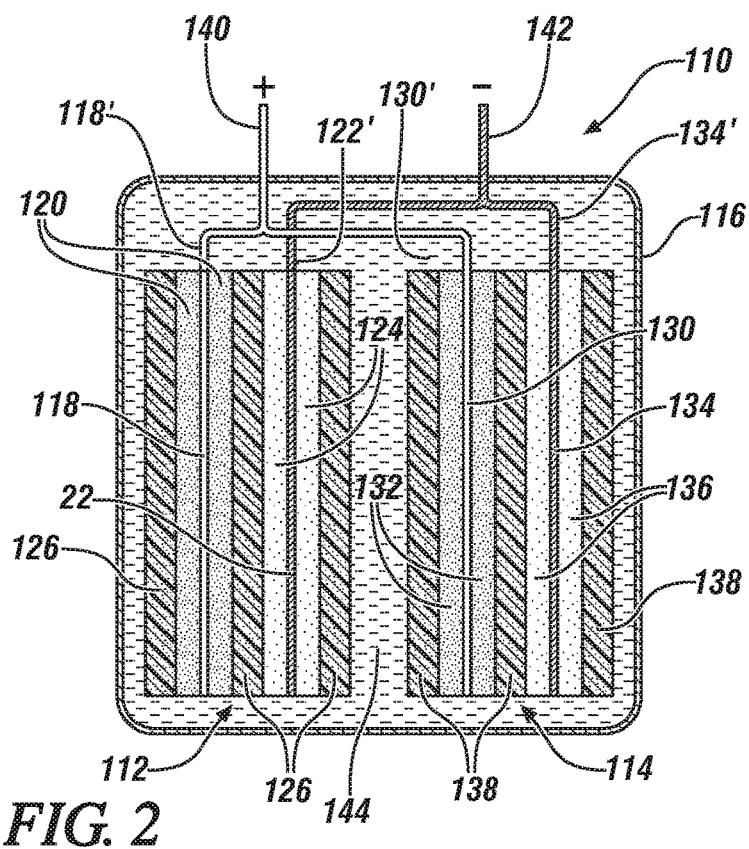
FIG. 2 is a simplified, schematic cross-sectional side view, with a portion of the pouch container removed, similar to FIG. 1, of the hybrid combination of a capacitor and lithium-ion cell with their common electrolyte solution. In this hybrid combination, the capacitor and lithium-ion cell are positioned in a common pouch in an arrangement in which they are in electrical DC parallel-connection for co-delivery of electrical power to an external circuit.

FIG. 2 illustrates a pouch-contained assembly 110 of a capacitor 112, battery 114, and common electrolyte solution 144 which are arranged and oriented in pouch 116 for parallel electrical connection between capacitor 112 and battery 114. Again, in this simplified illustration only single positive and negative electrode structures are illustrated for each of capacitor 112 and battery 114. In practice, a capacitor and battery would each comprise many connected positive electrodes with current collector tabs connected in a single positive terminal and many negative electrodes with current collector tabs electrically connected in a single negative terminal.

In this example and illustration, the electrodes and separator of capacitor 112 may be substantially identical in shapes and compositions with respect to the corresponding elements of capacitor 12 as shown in FIG. 1. And the electrodes and separator of battery 114 may be substantially identical in shapes and compositions with respect to the corresponding elements of battery 14 shown in FIG. 1. Again the facing parallel surfaces of separator layers 126, 138 of capacitor 112 and battery 114 are spaced apart by a distance in the range of 0.01-10 mm. Accordingly, the corresponding current collector foils, electrode layers and separators of FIG. 2 are identified by numerals 1xx (or 1xx') with respect to the same parts of FIG. 1 which are identified as xx or xx'.

The main difference between FIG. 1 and FIG. 2 is that capacitor 112. and battery 114 are arranged and oriented in pouch 116 for parallel electrical connection between capacitor 112 and battery 114, and for series connection with these combined elements and electrical power-requiring devices outside pouch 116. Accordingly, positive electrode tab 118' of capacitor 112 and positive electrode tab 130' of battery 114 are connected as a single positive (+) terminal 140 which extends through the top of pouch 116. In a similar arrangement, negative electrode tab 122' of capacitor 112 and negative electrode tab 134' of battery 114 are connected as a single negative (−) terminal 142 which extends through the top of pouch 116.

Thus, in the parallel connection arrangement of the electrodes of capacitor 112 and battery 114, the two components may be designed to operate in a common voltage window and to achieve a higher power in their common voltage range.

An assembled capacitor is illustrated in FIG. 3. In FIG. 3, the capacitor is identified by numeral 12 because it is intended to illustrate in perspective view, the capacitor structures illustrated in side cross-sectional view in FIGS. 1 and 2. As seen in FIG. 3, and described in downward order from top surface, the nine layers of capacitor 12 comprise a portion of the wound separator layer 26, a porous layer 20 of positive capacitor electrode material (e.g., resin-bonded activated carbon particles, an aluminum positive electrode current collector foil 18 with its uncoated connector tab 18', the opposing layer of porous positive electrode material 20, another portion of wound porous separator layer 26, a layer of porous negative capacitor electrode material 24 (e.g., resin-bonded activated carbon particles), a copper negative electrode current collector foil 22 with its uncoated connector tab 22', an opposing layer of porous negative electrode material 24, and another portion of wound separator layer 26. It is seen that a layer of positive electrode material 20 and a layer negative electrode material 24 lie against the corresponding faces of the porous separator 26. In the making of the capacitor 12, the separator 26 may have been wound around the respective electrode layers 20, 24. Or the electrode material may have been coated onto the separator surface or deposited (e.g., by an atmospheric plasma) onto the separator surface.

When capacitor 12 has been assembled with a like-shaped and like-made battery (e.g., battery 14) in a suitable container, like pouch 16, both the capacitor and battery will be suitably infiltrated with a shared lithium-ion transporting electrolyte.

In the above described electrode making process, particulate cathode material was coated on both sides of an aluminum current collector foil to form a capacitor cathode, and particulate anode material was coated onto both sides of a copper current collector foil to form a capacitor anode. The assembly of the capacitor cell was then completed by winding a porous polymeric separator layer around both electrode material surfaces of a capacitor cathode and around both electrode material surfaces of a capacitor anode. A like preparation process, using suitable electrode materials, may be used to make and assemble a lithium-ion battery cell for the hybrid combination.

The porous elements of the combined assembly are then infiltrated or impregnated under vacuum with a suitable lithium-cation and complementary anion containing electrolyte solution. And capacitor and battery members of the combination may be charged or otherwise prepared for their respective electrochemical functions.

Thus, specific examples have been presented for methods in the preparation of lithium-ion incorporating capacitors and batteries for assembly into a common container to serve as hybrid electrochemical devices for provision of electrical power in many devices consuming electrical energy. The examples are intended to illustrate practices of the invention and not the scope of the following claims.

The invention claimed is:

1. An enclosed hybrid combination of a (i) a unitary assembly consisting of one or more lithium-ion battery electrochemical cells, each battery cell having a layered structure and (ii) a unitary assembly consisting of one or more electrochemical capacitor cells, each capacitor cell having a layered structure, the unitary assembly of lithium-ion battery cells and the unitary assembly of capacitor cells being physically separated from each other while enclosed in a single common sealed container, the enclosed lithium-ion battery assembly and the enclosed capacitor assembly both being in contact with a single, common, lithium ion conducting, liquid electrolyte solution for the electrochemical performance of their respective capacitor and battery functions; the layered battery cells and layered capacitor cells of the hybrid combination being further characterized as follows:

each layered lithium-ion battery cell comprises an anode current collector layer with two opposing faces and an anode electrical connector tab, a porous layer of particulate battery cell anode material deposited on each face of the anode current collector, a cathode current collector layer with two opposing faces and a cathode electrical connector tab, a porous layer of particulate battery cell cathode material deposited on each face of the cathode current collector, and a porous battery cell separator layer physically separating facing porous layers of battery cell anode material and cathode material, each layered lithium-ion battery cell being exclusive of capacitor anode material or capacitor cathode material;

each layered capacitor cell comprises an anode current collector layer with two opposing faces and an anode electrical connector tab, a porous layer of particulate capacitor anode electrode material deposited on each face of the anode current collector, a cathode current collector layer with two opposing faces and a cathode electrical connector tab, a porous layer of particulate capacitor cell cathode material deposited on each face of the cathode electrode current collector, and a porous capacitor cell separator layer physically separating all facing porous layers of capacitor cell anode material and cathode material, the capacitor cell separator layer being distinct from the battery cell separator layer, each layered capacitor cell being exclusive of battery anode material or battery cathode material; and the common lithium ion electrolyte solution comprising a lithium salt dissolved in a non-aqueous solvent for battery cell function and capacitor cell function.

2. A hybrid combination of a (i) lithium-ion battery and (ii) a capacitor as stated in claim 1 in which porous layer electrodes and separators of the lithium-ion battery and the porous layer electrodes and separators of the capacitor are formed with the same rectangular shapes and rectangular side dimensions.

3. A hybrid combination of a (i) lithium-ion battery and (ii) a capacitor as stated in claim 1 in which the layered structure of the lithium battery and the layered structure of the capacitor are separated from each other in their common sealed container by a distance in the range of 0.01 mm to 10 mm.

4. A hybrid combination of a (i) lithium-ion battery and (ii) a capacitor as stated in claim 1 in which the outer layer of the layered structure of the lithium battery is a porous separator layer and the outer layer of the layered structure of the capacitor is a porous separator layer and the porous separator layers serve to separate the lithium-ion battery and the capacitor from each other in their common sealed container.

5. A hybrid combination of a (i) lithium-ion battery and (ii) a capacitor as stated in claim 1 in which the outer layer of the layered structure of the lithium battery is a porous separator layer and the outer layer of the layered structure of the capacitor is a porous separator layer and the outer porous separator layers are separated from each other in their common sealed container by a distance in the range of 0.01 mm to 10 mm.

6. A hybrid combination of a (i) lithium-ion battery and (ii) a capacitor as recited in claim 1 in which the battery and capacitor are placed in a polymer-coated aluminum foil pouch.

7. A hybrid combination of a (i) lithium-ion battery and (ii) a capacitor as recited in claim 1 in which the battery and capacitor are placed in a polymer-coated metal foil pouch having an polymeric interior structure that physically separates the battery and capacitor while permitting ionic-conductivity by the common electrolyte contacting each of them.

8. A hybrid combination of a (i) lithium-ion battery and (ii) a capacitor as recited in claim 1 in which the cathode current collector foil for each cell of the battery and capacitor is an aluminum foil and the anode current collector foil for each cell of the battery and capacitor is a copper foil.

9. A hybrid combination of a (i) lithium-ion battery and (ii) a capacitor as recited in claim 1 in which each battery cell cathode connector tab is connected as a battery cathode terminal which extends outside the common sealed container, each battery cell anode connector tab is connected as a battery anode terminal which extends outside the common sealed container, each capacitor cell cathode connector tab is connected as a capacitor cathode terminal which extends outside the common sealed container, and each capacitor cell anode connector tab is connected as a capacitor anode terminal which extends outside the common sealed container.

10. A hybrid combination of a (i) lithium-ion battery and (ii) a capacitor as recited in claim 1 in which the capacitor cathode material and the capacitor anode material each comprises activated carbon.

11. A hybrid combination of a (i) lithium-ion battery and (ii) a capacitor as recited in claim 1 in which the battery cell anode material is $Li_4Ti_5O_{12}$ spinel.

12. A hybrid combination of a (i) lithium-ion battery and (ii) a capacitor as recited in claim 1 in which the battery cell cathode active material is $LiMn_2O_4$ spinel.

13. A hybrid combination of a (i) lithium-ion battery and (ii) a capacitor as recited in claim 1 in which the common electrolyte comprises a lithium salt selected from the group consisting of lithium hexafluorophosphate ($LiPF_6$), lithium tetrafluoroborate ($LiBF_4$), lithium perchlorate ($LiClO_4$), lithium hexafluoroarsenate ($LiAsF_6$), and lithium trifluoroethanesulfonimide.

14. A hybrid combination of a (i) lithium-ion battery and (ii) a capacitor as recited in claim 13 in which the lithium salt is dissolved in one or more non-aqueous solvents selected from the group consisting of ethylene carbonate, dimethyl carbonate, methylethyl carbonate, and propylene carbonate.

15. An enclosed hybrid combination of a (i) a unitary assembly consisting of one or more lithium-ion battery electrochemical cells, each battery cell having a layered structure with opposing faces of each layer, rectangular sides and an end face and (ii) a unitary assembly consisting of one or more electrochemical capacitor cells, each capacitor cell having a layered structure with opposing faces of each layer, rectangular sides of the same dimensions as the sides of the battery cell, and an end face, the unitary assembly of lithium-ion battery cells and the unitary assembly of capacitor cells being enclosed in a single common sealed container with the end face of a battery cell spaced up to 10 mm from the end face of a capacitor cell, the enclosed lithium-ion battery assembly and the enclosed capacitor assembly both being in contact with a single, common, lithium ion conducting, liquid electrolyte solution for the electrochemical performance of their respective capacitor and battery functions; the layered battery cells and layered capacitor cells of the hybrid combination being further characterized as follows:

each layered lithium-ion battery cell comprises an anode current collector layer with two opposing faces and an anode electrical connector tab, a porous layer of particulate battery cell anode material deposited on each face of the anode current collector, a cathode current collector layer with two opposing faces and a cathode electrical connector tab, a porous layer of particulate battery cell cathode material deposited on each face of the cathode current collector, and a porous battery cell separator layer physically separating facing porous layers of battery cell anode material and cathode material, each layered lithium-ion battery cell being exclusive of capacitor anode material or capacitor cathode material;

each layered capacitor cell comprises an anode current collector layer with two opposing faces and an anode electrical connector tab, a porous layer of particulate capacitor anode electrode material deposited on each face of the anode current collector, a cathode current collector layer with two opposing faces and a cathode electrical connector tab, a porous layer of particulate capacitor cell cathode material deposited on each face of the cathode electrode current collector, and a porous capacitor cell separator layer physically separating facing porous layers of capacitor cell anode material and cathode material, the capacitor cell separator layer being distinct from the battery cell separator layer, each layered capacitor cell being exclusive of battery anode material or battery cathode material; and the common lithium ion electrolyte solution comprising a lithium salt dissolved in a non-aqueous solvent for battery cell function and capacitor cell function.

16. A hybrid combination of a (i) lithium-ion battery and (ii) a capacitor as recited in claim 15 in which the battery and capacitor are placed in a polymer-coated metal foil pouch having an polymeric interior structure that physically separates the battery and capacitor while permitting ionic-conductivity by the common electrolyte contacting each of them.

17. A hybrid combination of a (i) lithium-ion battery and (ii) a capacitor as recited in claim 15 in which the battery and capacitor are placed in a polymer-coated metal foil pouch with facing layers of porous separator material.

18. A hybrid combination of a (i) lithium-ion battery and (ii) a capacitor as recited in claim 15 in which each battery cell cathode connector tab is connected as a battery cathode terminal which extends outside the common sealed container, each battery cell anode connector tab is connected as a battery anode terminal which extends outside the common sealed container, each capacitor cell cathode connector tab is connected as a capacitor cathode terminal which extends outside the common sealed container, and each capacitor cell anode connector tab is connected as a capacitor anode terminal which extends outside the common sealed container.

* * * * *